United States Patent [19]

Ries

[11] 4,405,135

[45] Sep. 20, 1983

[54] WHEEL HUB AND SPINDLE SEAL

[75] Inventor: Donald L. Ries, Dearborn Heights, Mich.

[73] Assignee: Rockwell International Corporation, Pittsburgh, Pa.

[21] Appl. No.: 338,688

[22] Filed: Jan. 11, 1982

[51] Int. Cl.³ ............................................. F16J 15/32
[52] U.S. Cl. ..................................... 277/11; 277/152; 277/901
[58] Field of Search ................... 277/1, 12, 901, 9, 5, 277/11, 152, 153

[56] References Cited

U.S. PATENT DOCUMENTS

| | | | |
|---|---|---|---|
| 2,991,092 | 7/1961 | MacKay | 277/901 |
| 4,218,813 | 8/1980 | Cather | 277/1 |
| 4,359,228 | 11/1982 | Cather | 277/1 |

Primary Examiner—Robert I. Smith

[57] ABSTRACT

An improved rotary seal for a heavy wheel hub and axle assembly in which the radially inner end of an outer metal case is formed to pilot the wheel hub onto the axle during assembly and the diameter of the radially inner end of the case is intermediate the diameter of a resilient sealing element lip and the radially inner end of a flange of an inner member supporting the resilient sealing element.

6 Claims, 4 Drawing Figures

WHEEL HUB AND SPINDLE SEAL

BACKGROUND OF THE INVENTION

1. Field of the Invention

This invention relates to an improved seal for a wheel hub and axle assembly, and more specifically, to an improved rotary fluid seal for use between a heavy wheel hub and an axle spindle which serves to pilot the wheel hub onto the axle spindle during assembly.

2. Description of the Prior Art

The improved seal is particularly useful in a wheel hub and axle assembly that includes a liquid cooled, multiple disc friction brake mechanism of the type generally disclosed in application Ser. No. 307,818 filed on Oct. 2, 1981. Although prior art seals have been utilized to provide a rotary liquid seal between the wheel hub and axle spindle of such assemblies, the seal is located in an area which is not visable as the wheel hub is assembled to the axle spindle and the resilient sealing element may be rolled over or damaged during such assembly.

The wheel hub and axle assemblies to which the present invention relates are heavy duty assemblies primarily used on off-highway vehicles for construction, mining or agricultural purposes. Each wheel hub may weigh on the order of 150 to 300 pounds and may be 12 to 20 inches in diameter and 12 to 18 inches in axial length. During assembly, the wheel hubs are lifted by mechanical means until the bore is substantially aligned with the spindle and then moved, usually manually, axially along the spindle. Any misalignment between the wheel hub bore and the axle spindle will cause undesirable contact between the leading parts of the hub and axle spindle. The location of the spindle seal is such that it would be subject to such contact and the radially inward projecting metal flanges of conventional seals have been deformed by such contact. It is therefore an object of the present invention to avoid these problems.

SUMMARY OF THE INVENTION

The seal of the present invention avoids the foregoing problems through the use of an annular metal case having a radially extending flange with an inner edge dimensioned to pilot the massive wheel hub along the axle spindle, thereby minimizing substantial damaging contact with the seal and displacement of or damage to the resilient sealing element.

These and other objects of the invention are obtained through the use of a fluid seal comprising an outer annular metal case formed to provide an axially extending web having a flange extending radially inward at one end thereof and an inner annular metal member having a wall and a flange terminating in an edge of a given diameter. The outer case and the inner member are secured together with the flange of the inner member extending radially inwardly relative to the outer metal case web.

A resilient annular sealing element is secured to the flange of the inner annular member and provides a sealing lip which is normally located at a first position radially inwardly of the edge of the inner member and is displaceable radially outwardly to a second position also located radially inwardly of the edge of the inner member. The radially inwardly extending flange of the outer case terminates in an edge located radially between the second position of the lip seal and the edge of the flange of the inner annular metal member.

The radially inner extremity of the resilient sealing element is preferably an edge bounding one side of an oblique surface of the sealing lip and the other side of the oblique surface is bounded by an edge of a diameter less than the diameter of the edge of the flange of the inner annular metal member and the edge of the radially inwardly extending flange of the outer case is of substantially the same diameter as the edge bounding the other side of the oblique surface when the resilient seaing element is located in the first position.

In the preferred embodiment, a portion of the radially inward extending flange of the outer metal case is formed with an annular rib extending circumferentially around the flange to reinforce the flange against deformation and to provide an oblique surface sloping toward the resilient sealing element.

Further details of this structure and the relationship of the elements of the invention will become more readily apparent to those skilled in the art from the following description and the drawings.

BRIEF DESCRIPTION OF THE DRAWINGS

In the drawings, wherein like reference numerals refer to like parts.

DETAILED DESCRIPTION OF A PREFERRED EMBODIMENT

Figure 1:
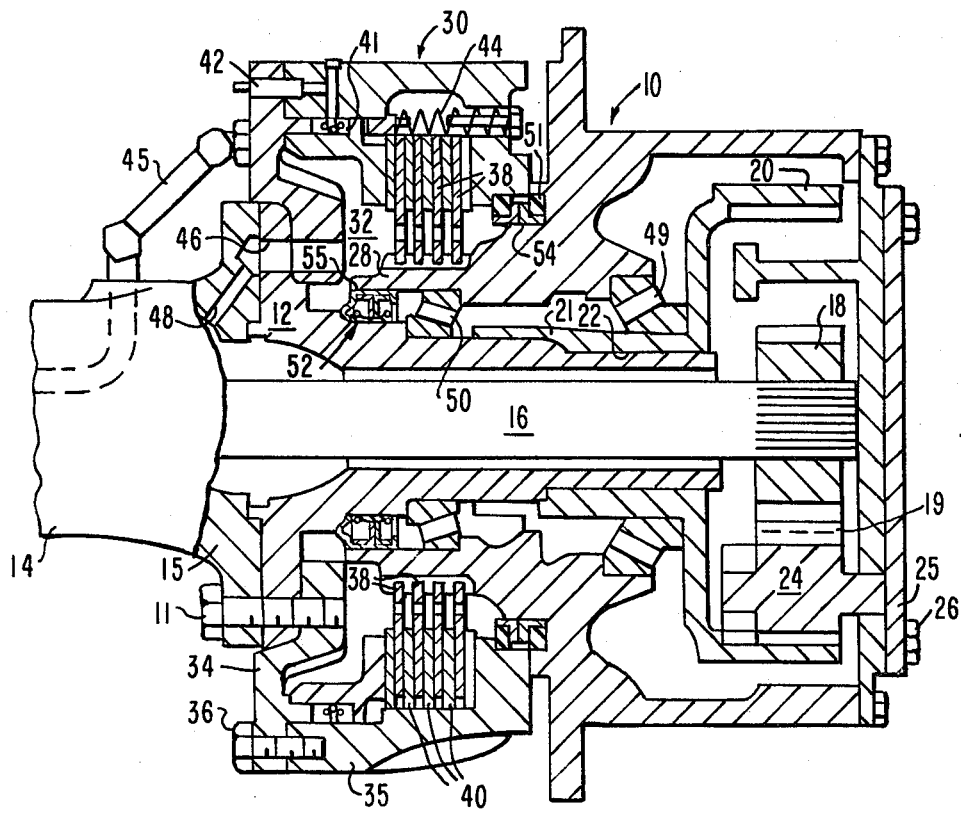
FIG. 1 is plan view partly in section of a liquid cooled friction brake incorporating the liquid seal of the present invention.

With reference to the drawings, FIG. 1 shows a wheel hub 10 rotatably mounted to a spindle 12 secured by a plurality of bolts 11 to a flange 15 at one end of a hollow axle housing 14.

An axle shaft 16 extends through the hollow interior of the axle housing 14 and the hollow interior of the spindle 12 and is splined to a sun gear 18. The sun gear 18 drives a plurality, usually three, planetary gears 19 internally of a floating ring gear supported by a hub 21 splined at 22 to the axially outer end of the spindle 12. The planetary pins 24 are seated in apertures provided to a planetary spider 25 which is secured by bolts 26 to the axially outer edge of the wheel hub 10. The wheel hub 10 is mounted for rotation about the spindle 12 by a bearing 50 and about the ring gear hub 21 by a bearing 49.

A brake mechanism 30 is provided in a sealed annular chamber 32 located between the wheel hub 10 and the axle flange 15 radially outwardly of the spindle 12 and a flange 28 of the wheel hub 10. The chamber 32 is defined and enclosed by a housing comprised of an end plate 34 secured to the axle housing flange 15 and an annular outer housing member 35 secured to the end plate 75 by bolts 36.

A stack of friction discs 38 and 40 are provided internally of the chamber 72. The friction discs 38 are rotor discs splined at their radially inner periphery to the radially outer surface of the wheel hub flange 28. The stationary discs 40 are splined at their radially outer periphery to the radially inner surface of the outer housing member 35.

An annular piston 41, generally L-shaped in cross section and having a radially extending flange is also provided in the chamber 32. A fluid passage 41 through the end plate 34 and outer housing member 35 enables the vehicle operator to selectively provide hydraulic fluid from a source (not shown) to move piston 41 to the right as shown in FIG. 1 to engage the axially facing surfaces of the stator discs 40 with adjacent surfaces of the rotor discs 38 to develop sufficient braking torque to resist rotation of the wheel hub 10 relative to the spindle 12 and drive axle housing 14. A plurality of return springs 44 act on ring abutting piston 41 and move the piston axially away from the friction discs 38 and 40 when the brake actuating hydraulic fluid pressure is released by the vehicle operator.

When the brake mechanism 30 is actuated, substantial thermal energy is generated which tends to shorten the useful life of the friction material provided to the discs 38 and 40. The friction discs are subjected to a circulating flow of lubricating oil to avoid the deleterious effects of the thermal energy generated when the brake mechanism is actuated.

The lubricating oil may be supplied to the chamber 32 through conduit 45 and returns through the passages 46, 48 to a sump of lubricating fluid provided within the hollow axle housing 14. Rotary seals 51 and 52 are respectively provided between the housing member 35 and the wheel hub 10 and between wheel hub flange 28 and the spindle 12 to prevent fluid leakage from the chamber 32.

During assembly, the rotary seals 51 and 52 are press-fit to the seating surfaces 54 and 55, respectively, on the wheel hub 10 and the wheel hub flange 28. The axle housing 14 and spindle 12 are held stationary and the wheel hub is moved axially with the wheel hub flange 28 traversing the spindle 12 until the inner case of bearing 50 is seated in abutment with the radial surface 56 of spindle 12. When the bearing 50 is seated, the resilient sealing lips of seal 50 engages the axially extending surface 57 of axle spindle 12.

Figure 2:
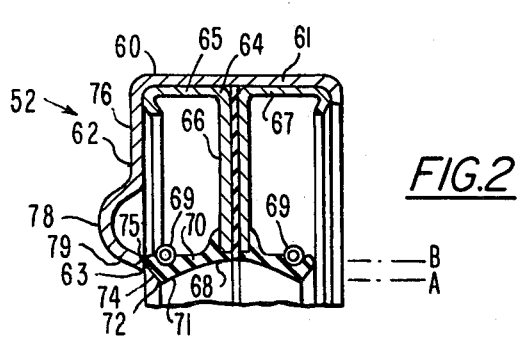
FIG. 2 is a sectional view of the fluid seal of the present invention.
Figure 3:
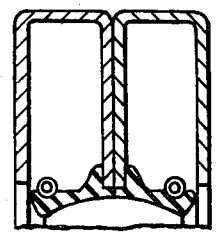
FIG. 3 is a sectional view of a prior art liquid seal.

Rotary seal 52, as shown by FIG. 2, has been designed to avoid difficulties previously experienced during this assembly operation with conventional prior art seals of the type illustrated in FIG. 3.

With reference to FIG. 2, rotary seal 52 is comprised of an outer annular metal case 60 formed to provide an axially extending web 61 having a flange 62 extending radially inward at one end thereof and an inner annular metal member 64 having a wall 65 and a flange 66 terminating in an edge 68 of a given diameter. The outer case 60, the inner member 64 and another inner member 67 are secured together by forming the axially spaced ends of the web 61 to tightly embrace the inner members 64 and 67 with the flange of the inner member extending radially inwardly relative to the outer metal case web 61

A resilient annular sealing element 70 is secured to the flange 66 of the inner annular member 64 and provides a sealing lip 71 which is normally located at a first position radially inwardly of the edge 68 of the inner member 64 as represented by the line A in FIG. 2 and is displaceable radially outwardly to a second position as represented by the line B in FIG. 2. The second position of the sealing lip is also located radially inwardly of the edge 68 of the inner member 64. The radially inwardly extending flange of the outer case terminates in an edge 63 located radially between the second position of the seaing lip 71 and the edge 68 of flange 66 of the inner annular metal member 64.

The radially inner extremity of the resilient sealing element 70 is preferably an edge 72 bounding one side of an oblique surface 74 of the sealing lip 71 and the other side of the oblique surface is bounded by an edge 75 of a diameter less than the diameter of the edge 68 of the flange 66 of the inner annular metal member 64. The edge 63 of the radially inwardly extending flange 62 of the outer case 60 is of substantially the same diameter as the edge 75 bounding the radially outer side of the oblique surface 74 when the resilient sealing element 70 is located in the first position.

An annular, helical compression spring 69 is provided in a groove around the radially outer surface of the sealing element 70 to seat the lip 71 against the surface to be sealed.

In the preferred embodiment, a portion of the radially inward extending flange 76 of the outer metal case 60 is formed with an annular rib 78 extending circumferentially around the flange 62 to reinforce the flange 62 against deformation and to provide an oblique surface 79 sloping toward the resilient sealing element 70.

The annular rib 78 is toroidal in form. The inner edge 63 of the outer case 60 is substantially aligned with the radially outer portion 76 of the flange 62 and the leftmost portion of the rib 78 is spaced axially further away from the flange 66 than the radially outer portion 76 of the flange 62 adjacent the outer metal case web 61.

Figure 4:
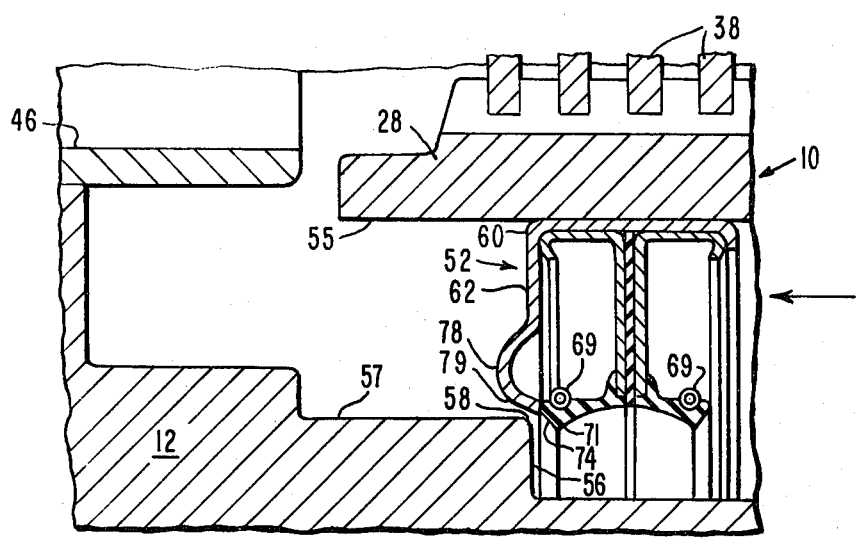
FIG. 4 is a diagramatic view, partly in section, showing the fluid seal of the present invention at one location during assembly of a wheel hub to an axle spindle.

The advantages offered by the seal 50 during assembly of the wheel hub 10 to the spindle 12 will now be described with reference to the sectional drawing of the relevant parts in FIG. 4. As the wheel hub 10 is moved to the left, the wheel hub flange 28 traverses the spindle 12 and the oblique surface 79 of the annular rib 78 formed on the flange 66 of outer metal case 60 pilots the wheel hub 10 over the corner 58 that connects radially extending bearing seating surface 56 to the axially extending surface 57 of spindle 12. The oblique surface 79 also guides the oblique surface 74 of the sealing lip 71 into contact with the rounded corner 58. As the wheel hub 10 is moved to the left, the oblique surface 74 of the sealing lip 71 slides over the corner 58 moving the sealing lip 71 radially outward to its second position in sealing engagement with the axially extending cylindrical surface 57 of the spindle 12. The annular spring 69 compresses the sealing lip 71 and maintains sealing contact between the resilient sealing element and the spindle surface 57.

The invention may also be embodied in other specific forms without departing from the spirit or essential characteristics thereof. The foregoing description of the preferred embodiment of the invention is therefore to be considered to be illustrative and not restrictive, the scope of the invention being defined by the appended claims and all changes which come within the meaning and range of equivalency of the claims are therefore intended to be embraced thereby.

I claim:

1. A fluid seal comprising:
    an outer annular metal case formed to provide an axially extending web having a flange extending radially inward at one end thereof,
    an inner annular metal member having a wall and a flange terminating in an edge of a given diameter,
    means securing said outer case and said inner member together with said flange of said inner annular member extending radially inwardly relative to said metal case web, and a resilient annular sealing element secured to said flange of said inner annular member and providing a sealing lip normally located at a first position radially inwardly of said edge of said inner member, said lip being displaceable radially outwardly to a second position located radially inwardly of said edge of said inner member, said radially inwardly extending flange of said outer case terminating in an edge located radially between said second position of said lip seal and said edge of said inner annular metal member and a portion of said radially inward extending flange of said outer metal case adjacent said edge is formed as an oblique surface sloping toward said sealing lip.

2. The fluid seal defined by claim 1, wherein an annular region of said radially inward extending flange of said outer metal case adjacent said edge is spaced axially further away from said flange of said inner annular member than said radially inward extending flange adjacent said web and the radially inward portion of said region adjacent said edge is formed as said oblique surface sloping toward said sealing lip.

3. The fluid seal defined by claim 4, wherein said annular region of said radially inward extending flange is toroidal in form.

4. The fluid seal defined by claim 1, wherein said edge of said radially inwardly extending flange of said outer case is substantially axially aligned with the radially outer portion of said flange and an annular region of said flange between said edge and said radially outer portion of said flange is formed so as to be spaced axially further away from said flange of said inner annular member than said radially outer portion of said flange and the radially inward portion of said flange connecting said edge with said annular region presents said oblique surface sloping toward said sealing lip.

5. A fluid seal comprising an outer annular metal case formed to provide an axially extending web having a flange extending radially inward at one end of said web, an inner annular metal member having a wall and a flange terminating in an edge of a given diameter, means securing said outer case and said inner member together with said flange of said inner annular member extending radially inwardly relative to said metal case web, a sealing element secured to said flange of said inner annular member and providing a resilient annular sealing lip radially displaceable to a sealing position, said radially inwardly extending flange of said outer case terminating in an edge located radially between said lip seal in said sealing position and said edge of said inner annular member, and a portion of said radially inward extending flange of said outer metal case adjacent said edge formed as a rib to circumferentially reinforce said flange of said outer metal case against deformation and to provide an oblique surface sloping toward said sealing lip.

6. The fluid seal defined by claim 5, wherein said rib extends circumferentially around said flange.

* * * * *